June 9, 1936.  C. O. HANE  2,043,613
CALIPER ATTACHMENT FOR CUTTER HEADS AND THE LIKE
Filed Nov. 20, 1933  2 Sheets-Sheet 2
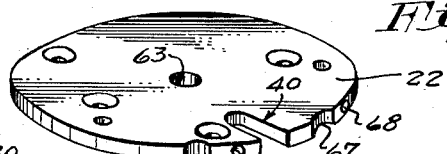
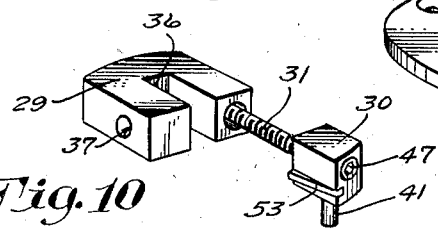
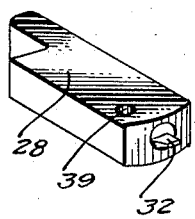
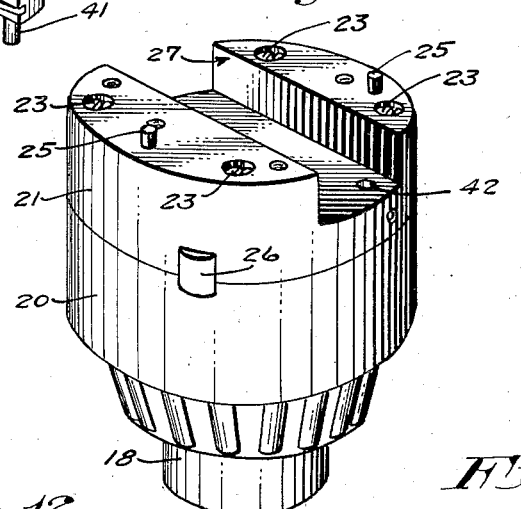
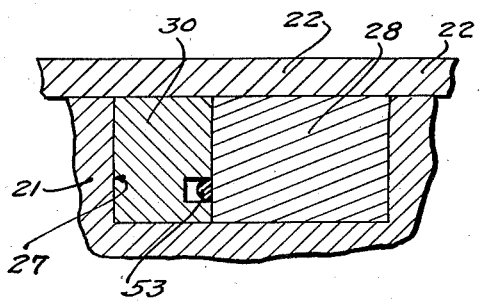
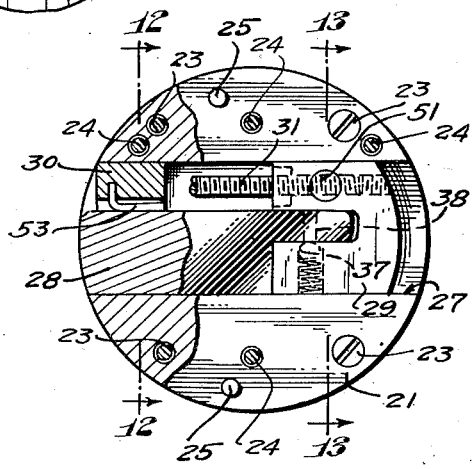
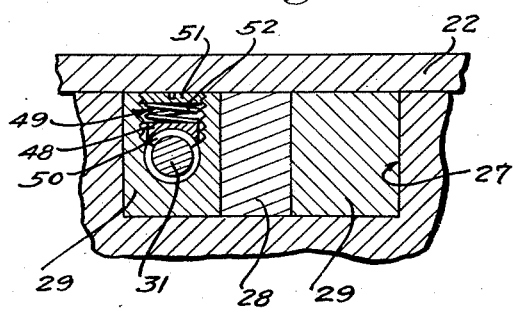
Inventor
Carl O. Hane
By his Attorneys
Merchant and Kilgore Patented June 9, 1936

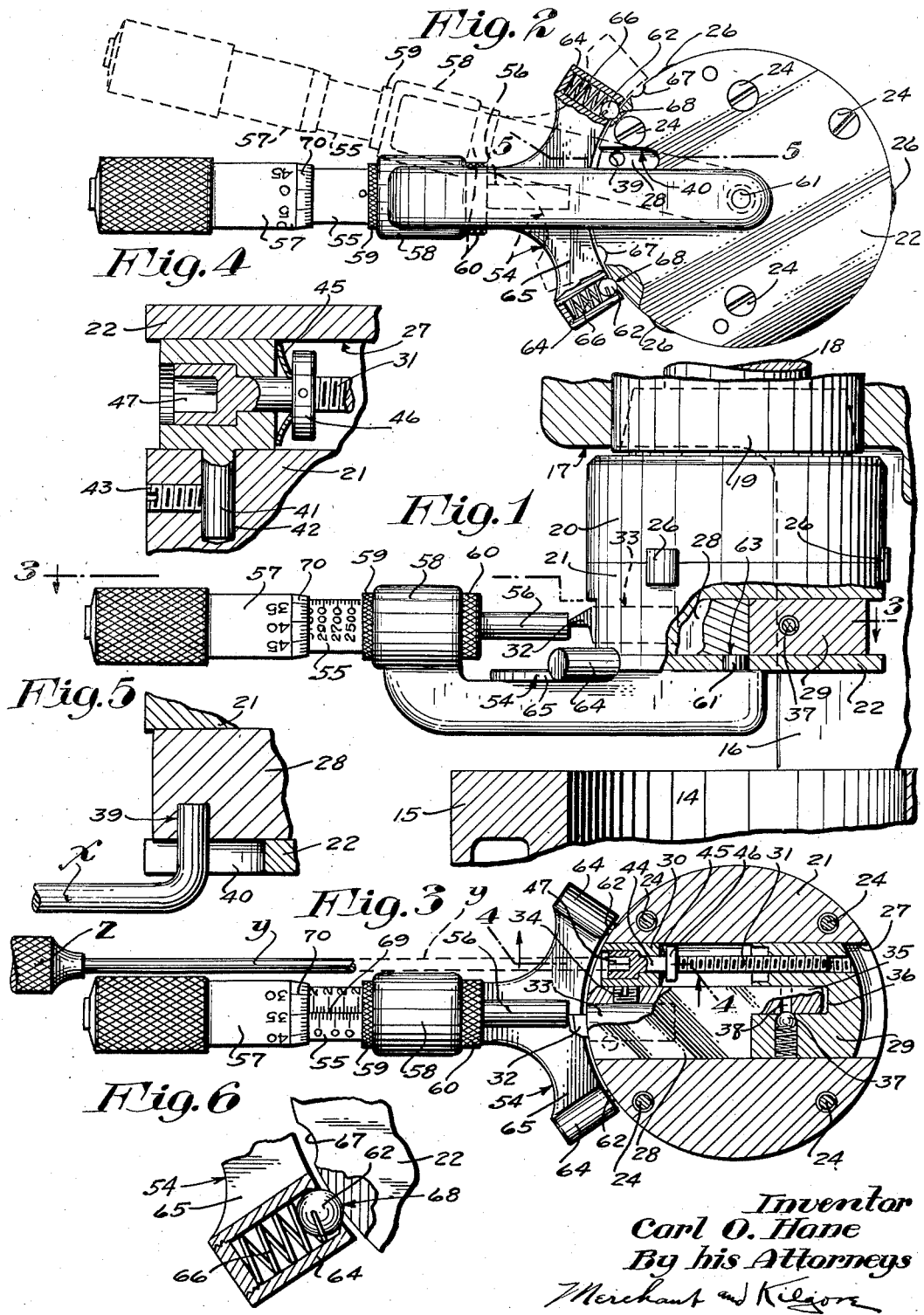

2,043,613

UNITED STATES PATENT OFFICE 2,043,613

CALIPER ATTACHMENT FOR CUTTER HEADS AND THE LIKE

Carl O. Hane, Minneapolis, Minn., assignor to Storm Manufacturing Co., Inc., Minneapolis, Minn., a corporation of Minnesota Application November 20, 1933, Serial No. 698,784

13 Claims. (Cl. 33—185)

My invention relates to boring cylinders and more particularly to the reboring of worn cylinders of internal combustion engines.

The object of the invention is the provision of simple and highly efficient means for adjusting a cutting tool in the cutter head for a boring machine and the mounting of a caliper on the cutter head for use in calibrating its cutting tool to bore a cylinder to a predetermined diameter without removing the cutting tool from the cutter head and while the boring machine is mounted on an engine block.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view, partly in side elevation and partly in section, showing the cylinder block of an internal combustion engine, the base and the boring bar of a boring machine mounted on the block, and the improved cutter head on the boring bar to which is applied a caliper for calibrating the cutting tool of said head;

Fig. 2 is a bottom plan view of the cutter head and caliper with some parts broken away and sectioned and with the caliper shown in a different position by means of broken lines;

Fig. 3 is a view partly in plan and partly in section taken substantially on the line 3—3 of Fig. 1 and also fragmentarily and diagrammatically showing an operating wrench applied to the feed-screw of the cutter head;

Fig. 4 is a fragmentary detail view with some parts sectioned on the line 4—4 of Fig. 3, on an enlarged scale;

Fig. 5 is a fragmentary detail view principally in section taken on the line 5—5 of Fig. 3, on an enlarged scale, and also fragmentarily showing a pulling tool applied to the abutment member;

Fig. 6 is a fragmentary detail view, on an enlarged scale, showing one of the latch connections between the caliper frame and the bottom plate of the cutter head;

Fig. 7 is a bottom perspective view of the cutter head with some parts removed;

Fig. 8 is a bottom perspective view of the bottom plate removed from the cutter head;

Fig. 9 is a perspective view of the abutment member, the anchor member, and the feed-screw removed from the cutter head;

Fig. 10 is a perspective view of the tool carrier and cutting tool removed from the cutter head;

Fig. 11 is a bottom plan view of the cutter head with some parts removed and other parts broken away and sectioned;

Fig. 12 is a fragmentary detail view in section taken on the line 12—12 of Fig. 11, on an enlarged scale; and Fig. 13 is a fragmentary detail view in section taken on the line 13—13 of Fig. 11, on an enlarged scale.

The numeral 14 indicates one of the cylinders in the block 15 of an internal combustion engine and the numeral 16 indicates the base of a boring machine mounted on said block and having a work opening 17. For the purpose of this case, it will not be necessary to show the clamp for securing the base 16 to the block 15 with the boring bar 18 of the boring machine axially aligned with the cylinder 14. The lower bearing for the boring bar 18, which is above the work opening 17, is indicated by the numeral 19.

The improved cutter head, which is annular, is rigidly secured to the lower end of the boring bar 18 in axial alignment therewith and comprises an upper section 20, a lower section 21, and a removable bottom plate 22 for said lower section. The cutter head section 21 is detachably but rigidly secured to the upper section 20 by four screws 23 and the bottom plate 22 is detachably but rigidly secured to said section 21 by four screws 24 to a pair of positioning pins 25.

The improved cutter head is provided with a device for centering it in a cylinder but for the purpose of this case, it is not thought necessary to illustrate the same, except the radially projected members 26.

A way 27 is formed in the cutter head section 21 at its under side and the bottom of said way is formed by the bottom plate 22. Said way is rectangular in cross-section and extends diametrically through the cutter head. Mounted in the way 27 is a tool holder 28, an abutment member 29, an anchor member 30, and a feed-screw 31. The tool holder 28 is in the form of an elongated bar that is rectangular in cross-section and has bearing contact with the bottom, the top and one of the sides of the way 27. A cutting tool 32 is carried by the tool holder 28 and has a shank 33 removably mounted in a socket-like seat in the outer end of the tool holder 28. The shank 33 is rigidly but releasably secured to the tool holder 28 by a set-screw 34, see Fig. 3. The forward end of the shank 33 is flush with the periphery of the cutter head and the cutting tool 32 projects outwardly of said cutter head through one end of the way 27. The cutting face of the tool 32 is on a line that radiates from the axis of the cutter head.

The abutment member 29, which is rearward of the tool holder 28, has a close working fit with all sides of the way 27. It will be noted that the tool holder 28 is considerably narrower than the width of the way 27 and has on its inner end a shank 35 which is removably held in a notch-like seat 36 in the face of the abutment member 29. This abutment member 29 affords an end thrust bearing for the tool holder 28. The shank 35 is releasably secured to the abutment member 29 by a spring-pressed latch ball 37 which extends into a seat 38 in the shank 35. Said latch ball 37 is arranged to release the shank 35 by a forward pull on the tool holder 28 to permit said holder to be removed from the cutter head. As a convenient means for removing the tool holder 28 from the cutter head, said holder is provided at its under side with a bore-like seat 39 adapted to releasably receive the bent end portion of a pulling tool X. A peripheral clearance notch 40 for the pulling tool X is formed in the bottom plate 22, see Fig. 5.

To replace the tool holder 28 in the cutter head it is only necessary to press the same endwise rearwardly into the way 27 with sufficient force to cause the shank 35 to cam the latch ball 37 out of its path of movement and when the seat 38 is aligned with the latch ball 37, said ball will snap into said seat and thereby releasably connect the shank 35 to the abutment member 29.

The anchor member 30 is rectangular in cross-section and said member and the abutment member 29 hold the tool holder 28 against the side of the way 27 with which it has bearing contact and for straight line endwise sliding movement and said members have bearing contact with the other side of said way.

The anchor member 30 is rigidly but removably secured to the cutter head section 21 by a perpendicular stud 41 formed therewith and extends into a bore-like seat 42 in the cutter head. A set-screw 43 having screw-threaded engagement with the cutter head section 21 impinges against the stud 41 and holds the same in its seat 42.

The feed-screw 31 extends longitudinally in the way 27 at one side of the tool holder 28 and parallel to its line of movement. Said feed-screw, at its forward end portion, is swivelled to the anchor member 30 as indicated at 44, and has screw-threaded engagement with the abutment member 29. The swivel connection 44 includes a spring washer 45 compressed between the inner face of the anchor member 30 and a collar 46 keyed to the feed-screw 31. This spring washer 45 prevents end play in the feed-screw 31 relative to the anchor member 30. The feed-screw 31, at its outer end portion, is diametrically extended and has formed therein a poly-sided socket 47 arranged to receive a socket-like wrench Y by which the feed-screw 31 may be rotated to move the abutment member 29 either forwardly or backwardly in the way 27 and thereby imparts like movements to the tool holder 28 to project or retract the cutting tool 32. The socket wrench Y, as shown, has a long rod-like body on the outer end of which is a handle Z.

To prevent the feed-screw 31 from being accidentally turned when not operated by the wrench Y, there is provided a friction device in the form of a loose block 48 held in a chamber 49 in the abutment member 29 and having one or more screw-thread segments 50 that engage the screw-threads on the feed-screw 31, see Fig. 11.

This chamber 49 is normally closed by a screw-cap 51 and a coiled spring 52 is compressed between the block 48 and the screw-cap 51 and yieldingly holds the screw-thread segments 50 in contact with the feed-screw 31. Obviously by turning the screw-cap 51 into or out of the chamber 49 the tension of the spring 52 may be varied, at will.

The tool holder 28 is yieldingly pressed toward the side of the way 27 with which it has bearing contact by a spring 53 which lies in a groove in the anchor member 30 and is secured at one end to said anchor member.

To set the cutting tool 32, without removing the same from the cutter head, a predetermined distance from the axis of the cutter head and for boring a cylinder to a predetermined diameter, there is provided a caliper that is applicable to the cutter head. This caliper includes a frame 54, a barrel 55, a micrometer screw 56 having threaded engagement with said barrel, and a thimble 57 fixed to the outer end of said screw in axial alignment therewith and telescoped onto the outer end of the barrel 55. The screw-threaded engagement between the barrel 55 and the micrometer 56 is not shown but this part of the caliper is of standard and well-known construction and it is not thought necessary to illustrate the same.

The barrel 55 is mounted in a sleeve bearing 58 formed with the outer end portion of the frame 54 and supports said barrel above the frame 54 with its axis on a line that extends radially from the axis of the cutter head. This barrel 55 is rigidly secured to the bearing 58 by nuts 59 and 60 on said barrel and which nuts engage opposite ends of the bearing 58.

The caliper frame 54 is detachably secured to the cutter head by a pivot stud 61 and a latch device comprising a pair of spring-pressed latch balls 62. The stud 61 is perpendicular to the upper face of the frame 54 and arranged to be projected, by a lifting movement of the caliper, into a bore-like seat 63 in the bottom plate 22 and which seat is in true axial alignment with the cutter head. When the pivot stud 61 is in the seat 63 the frame 54 engages the bottom plate 22 at its under side as a stop. With the caliper temporarily connected to the cutter head by the pivot stud 61, the micrometer screw 56 extends radially away from the axis of the cutter head in axial alignment with the face of the cutting tool 32 and with the cutting point of said tool substantially at the axis of the micrometer screw 56.

The two latch balls 62 are mounted in a pair of cylindrical housings 64 formed on the outer ends of a pair of arms 65 which extend circumferentially around the cutter head in opposite directions from the axis of the bearing sleeve 58. The axes of the housings 64 are on lines that extend radially from the axis of the cutter head and their inner ends have contracted openings through which the latch balls 62 are yieldingly projected by coiled springs 66, see Fig. 6, for engagement with the periphery of the bottom plate 22. The edges of the arms 65, adjacent to the bottom plate 22, are on the arc of a circle, the center of which is at the axis of the cutter head and which edges are spaced from the bottom plate 22 to leave clearance therebetween. The contracted openings in the outer ends of the housings 64 limit the projecting movements of the latch balls 62 by the springs 66.

When applying the caliper to the cutter head or removing the same therefrom, the same is positioned as shown by broken lines in Fig. 2, and notch-like passageways 67 in the periphery of the bottom plate 22 give clearance to the latch balls 62 during the lifting movement of the caliper to project its pivot stud 61 into the seats 63 or withdraw the same therefrom. After the pivot stud 61 has been completely inserted into the seat 63 the caliper is swung circumferentially about the axis of the cutter head and into its full line position, as shown in Fig. 2. In this position of the caliper the latch balls 62 are spring-projected into shallow seats 68 in the periphery of the bottom plate 22 and thereby lock the caliper to the cutter head.

The barrel 55 is provided with longitudinally extended graduations 69 and the thimble 57 is provided with cooperating circumferentially extended graduations 70. The graduations 69 are in definite relation to the axis of the pivot stud 61 and the reading at the intersections of the graduations 69—70 gives the exact distance, in inches and one-thousandths thereof, the outer end of the micrometer screw 56 is from the axis of the cutter head.

To set the cutting tool 32 to bore a cylinder to a definite and predetermined diameter, the thimble 57 is turned to either project or retract the micrometer screw 56 until the correct reading is obtained by the graduations 69—70. With the micrometer screw 56 set with its outer end the correct distance from the axis of the stud 61, the caliper is applied to the cutter head as heretofore described, and the wrench Y inserted into the socket 47. By means of the wrench Y the feed-screw 31 is rotated to slide the abutment member 29 in the way 27 to project the tool holder 28 until the cutting tool 32 impinges against the outer end of the micrometer screw 56. The operator while operating the wrench Y can tell by the sense of touch when the cutting tool 32 is in proper contact with the micrometer screw 56. When the cutting tool 32 has been positioned by the caliper, it will bore a cylinder to the diameter indicated by the reading on the caliper. It will be noted that when the wrench Y is in the socket 47 said wrench extends parallel to the longitudinal center of the caliper and at one side of the caliper where the same may be freely operated.

From the above description it is evident that the caliper may be adjusted to position the cutting tool 32 to bore a cylinder to a predetermined diameter and then applied to the cutter head through the work opening 17 while the boring machine is mounted on the cylinder block 15 and the cutting tool adjusted to the caliper while said tool is in the cutter head and said cutter head positioned at the work opening 17.

What I claim is:

1. In a caliper, a frame, an axially adjustable pin mounted on the frame, a pair of co-operating members carried by the frame, one of said members being fixed relative to the frame and the other being relatively movable, said two members having co-operating graduations, and means for releasably attaching the frame to a rotatable head having an adjustable cutting tool, an axial seat and a peripheral seat, said means including a stud on the frame arranged to enter said axial seat, said means also including a latch member arranged to enter said peripheral seat and hold the frame with the pin in predetermined relation to the cutting tool, whereby when either the pin or the cutting tool is adjusted to impinge the one with the other the diameter of a bore cut or to be cut by the cutting tool may be determined by a reading of the graduations.

2. In a caliper, a frame, an axially adjustable pin mounted on the frame, a pair of co-operating members carried by the frame, one of said members being fixed relative to the frame and the other being relatively movable, said two members having co-operating graduations, and means for releasably attaching the frame to a rotatable head having an adjustable cutting tool, an axial seat and a pair of peripheral seats, said means including a stud on the frame arranged to enter said axial seat, said means also including a pair of latch members located one on each side of the pin and arranged to enter said peripheral seats and hold the frame with the pin in predetermined position relative to the cutting tool, whereby when either the pin or the cutting tool is adjusted to impinge the one with the other the diameter of a bore cut or to be cut by the cutting tool may be determined by a reading of the graduations.

3. In a caliper, a frame, an axially adjustable pin mounted on the frame, a pair of co-operating members carried by the frame, one of said members being fixed relative to the frame and the other being relatively movable, said two members having co-operating graduations, and means for releasably attaching the frame to a rotatable head having an adjustable cutting tool, an axial seat, a pair of peripheral passageways and a pair of peripheral seats, said frame attaching means including a pivot stud arranged to enter said axial seat and hold the frame for swinging movement about the axis of the head said means also including a pair of latch members arranged to enter said passageway during movement of the stud into the axial seat and to be moved out of the passageways and into the peripheral seats by swinging movement of the frame about the axis of the stud, said latch members when in the peripheral seats hold the frame with the pin in predetermined position relative to the cutting tool, whereby when either the pin or the cutting tool is adjusted to impinge the one with the other the diameter of a bore cut or to be cut by the cutting tool may be determined by a reading of the graduations.

4. In a caliper, a frame, an axially adjustable pin mounted on the frame, a pair of co-operating members carried by the frame for adjusting the pin, one of said members being fixed relative to the frame and the other being relatively movable, said two members having co-operating graduations, centering means detachably connecting the frame to a rotatable head for pivotal movement about the axis thereof, said head having an adjustable cutting tool, and interengaging means on the head and frame for holding the frame with the pin in predetermined relation to the cutting tool.

5. In a caliper, a frame, an axially adjustable pin mounted on the frame, a pair of co-operating members carried by the frame for adjusting the pin, one of said members being fixed relative to the frame and the other being relatively movable, said two members having co-operating graduations, means for attaching the frame to a rotatable head having an adjustable cutting tool for turning movement about the axis of said head, and other means for holding the frame from turning about said axis and with the pin in a predetermined relation to the cutting tool.

6. In a caliper, a frame, an axially adjustable pin mounted on the frame, a pair of cooperating members carried by the frame for adjusting the pin, one of said members being fixed relative to the frame and the other being relatively movable, said two members having cooperating graduations, and three-point contact means for attaching the frame to a rotatable head having an adjustable cutting tool, one of said contact points being pivoted at the axis of the head and the other two being at the perimeter thereof for holding the frame from turning about said axis with the pin in predetermined relation to the cutting tool.

7. In a caliper, a frame, an adjustable member mounted on the frame, said frame having means adapted to engage a rotatable head at the axis thereof, said head having a cutting tool adjacent to its periphery, and other means for connecting the frame to the head, at the perimeter thereof, in a predetermined position in which the adjustable member is in predetermined relation to the cutting tool.

8. In a caliper, a frame, an adjustable member mounted on the frame, and three-point contact means for attaching the frame to a rotatable head having an adjustable cutting tool, one of said contact points being at the axis of the head and the other two being independently movable for contact with the perimeter of the head, said three-point contact means holding the frame on the head with the adjustable member in predetermined relation to the cutting tool.

9. In a caliper, a frame, an adjustable member mounted on the frame, and three-point contact means for attaching the frame to a rotatable head having an adjustable cutting tool, one of said contact points being at the axis of the head and the other two being yieldingly movable for contact with the perimeter of the head, said three-point contact means holding the frame on the head with the adjustable member in predetermined relation to the cutting tool.

10. A cutter head having a radially adjustable cutting tool and an axially disposed caliper frame centering seat in the lower face thereof, said head having caliper supporting means radially disposed with respect to the axis of said seat and adapted to cooperate therewith to support the caliper frame with its gauge axially aligned with the radial tool of said head.

11. In a device of the class described, a cutter head having a radially adjustable tool and means for calibrating the distance from the axis of the cutter head to the cutting edge of said tool, comprising a caliper carrying frame, seating means axially disposed on the bottom face of said cutter head for rotatably supporting one end of said frame, said head having means radially disposed with respect to the axis of said seating means and adapted to cooperate therewith to support the other end of the caliper frame, whereby the caliper is axially aligned with the radially adjustable tool.

12. In a caliper, a frame, an axially adjustable pin mounted on the frame, a pair of cooperating members carried by the frame for adjusting the pin, one of said members being fixed relative to the frame and the other being relatively movable, said members having cooperating graduations, three point contact means for attaching the frame across the end of a rotatable cutter head having a radially adjustable cutting tool, said means holding the frame from turning about the axis of said cutter head, whereby the frame is supported on the head with the pin in predetermined relation to the cutting tool.

13. A caliper for setting rotatable cutter heads of the vertical type having a radially adjustable cutting tool adjacent the bottom face of said head, comprising a frame having an inner elongated flat body portion adapted to be positioned across the bottom face of the cutter head and an outer upwardly turned end portion, an adjustable member carried by said end portion with its axis disposed parallel to the upper face of the inner body portion and spaced means upstanding from said frame for attaching the frame across the bottom face of the head, whereby the adjustable member is held in predetermined angular relation to the radially adjustable tool.

CARL O. HANE.